(12) United States Patent
Beaver, Jr. et al.

(10) Patent No.: US 11,174,611 B1
(45) Date of Patent: *Nov. 16, 2021

(54) ADSORBENT BOOM FOR THE CONTAINMENT OF CONTAMINANT SPILLS

(71) Applicant: HalenHardy LLC, Bellwood, PA (US)

(72) Inventors: Donald L. Beaver, Jr., Bellwood, PA (US); Patrick E. Healy, Gallitzin, PA (US); Joshua D. Beaver, Bellwood, PA (US); Irvin R. Parks, Jr., Alexandria, PA (US); Brandon W. Guida, Bellwood, PA (US)

(73) Assignee: HalenHardy LLC, Bellwood, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,209

(22) Filed: Mar. 5, 2020

Related U.S. Application Data

(63) Continuation of application No. 15/881,895, filed on Jan. 29, 2018, now Pat. No. 10,626,570.

(60) Provisional application No. 62/454,941, filed on Feb. 6, 2017.

(51) Int. Cl.
| | |
|---|---|
| *E02B 15/06* | (2006.01) |
| *E02B 15/04* | (2006.01) |
| *B01D 15/10* | (2006.01) |
| *B01J 20/28* | (2006.01) |
| *B01J 20/26* | (2006.01) |
| *C02F 1/28* | (2006.01) |
| *E02B 15/10* | (2006.01) |
| *C02F 1/40* | (2006.01) |

(52) U.S. Cl.
CPC ............ *E02B 15/045* (2013.01); *B01D 15/10* (2013.01); *B01J 20/261* (2013.01); *B01J 20/262* (2013.01); *B01J 20/2804* (2013.01); *C02F 1/285* (2013.01); *C02F 1/40* (2013.01); *E02B 15/101* (2013.01)

(58) Field of Classification Search
CPC ....................................................... B01D 15/10
See application file for complete search history.

(56) References Cited

U.S. PATENT DOCUMENTS

| | | |
|---|---|---|
| 3,539,013 A | 11/1970 | Smith |
| 3,630,891 A | 12/1971 | Peterson et al. |
| 4,099,619 A | 7/1978 | Hudler et al. |
| 5,165,821 A | 11/1992 | Fischer et al. |
| 5,256,466 A | 10/1993 | Berringan et al. |
| 5,360,654 A | 11/1994 | Anderson et al. |
| 8,512,552 B1 | 8/2013 | Rossi |

(Continued)

OTHER PUBLICATIONS

Childress B., "Upstate innovators are taking the lead in eco-innovation". Upstate Business Journal, Mar. 15, 2017.

(Continued)

*Primary Examiner* — Matthew O Savage
(74) *Attorney, Agent, or Firm* — Fox Rothschild LLP

(57) ABSTRACT

A system, method for forming, and a method of manufacturing a boom for the containment of contaminants is disclosed. The boom includes a cover and an adsorbent or absorbent material disposed within the cover. The adsorbent or absorbent material may be formed of one or more sheets of flexible fabric folded upon itself to form a convoluted structure within the elongated cover. Additionally, the material disposed within the elongated cover may form a non-cylindrical cross-section. The material may be at least partially a polyester material.

20 Claims, 11 Drawing Sheets

(56) References Cited

U.S. PATENT DOCUMENTS

| | | |
|---|---|---|
| 9,266,749 B1 | 2/2016 | Rainer |
| 10,626,570 B1 * | 4/2020 | Beaver, Jr. .............. C02F 1/285 |
| 2012/0061323 A1 | 3/2012 | Stewart et al. |
| 2017/0130414 A1 | 5/2017 | Joiner et al. |

OTHER PUBLICATIONS

New Pig webpage, "PIG® Oil-Only Spaghetti Boom" product description, printed Apr. 3, 2017.
PIG® Oil-Only Spaghetti Boom product information sheet, printed Apr. 3, 2017.
New Pig, Low-profile Flat Absorbent Sock PID 100 description, printed Apr. 3, 2017.
Monarch Green webpage, Flex Booms description, printed Apr. 3, 2017.

* cited by examiner

ADSORBENT BOOM FOR THE CONTAINMENT OF CONTAMINANT SPILLS

CROSS-REFERENCE TO RELATED APPLICATIONS

This patent document claims priority to, and is a continuation of, U.S. patent application Ser. No. 15/881,895, filed Jan. 29, 2018, which in turn claims priority to U.S. Provisional Application No. 62/454,941, filed Feb. 6, 2017. The disclosure of each priority application is fully incorporated into this document by reference.

BACKGROUND

This patent document relates to booms used for the containment of oil or other chemical spills. More particularly, the patent document relates to booms formed using substantially flat, oil-adsorbent fabric sheets that are highly compressible and flexible, and a method of making such oil-adsorbent booms.

There are currently many different oil-adsorbent (or oil-absorbent) boom products on the market for use in the containment of oil or other chemical spills, both on land and in water. Due to the locations and environments where these booms are utilized, they generally must contain materials which are both oleophilic (i.e., oil-absorbent or oil-adsorbent) and hydrophobic (i.e., water-resistant). With such a configuration, the booms may effectively adsorb oil or other chemical spills, while not absorbing water from the surrounding environment. They are commonly used in the form of tubular or cylindrical elongated sacks of netting which retain the adsorbent material. Following an oil or chemical spill, the booms are placed around the polluted location in order to prevent the expansion of the spill and simultaneously adsorb the oil from the ground or water surface.

Often, the adsorbent material used within the booms includes melt-blown polypropylene or other polymers in the form of pulp, flakes, etc. In order to manufacture the boom, the melt-blown polypropylene or other material(s) is stuffed into a cylindrical, elongated sack, either by hand or by machine (e.g., ram, auger, blowing, etc.). FIG. 1 illustrates a cut-away cross-section of an example of such a conventional boom 10, wherein an adsorbent material 12 is stuffed within a surrounding netting 14 so as to form a tubular structure. However, the process of stuffing the adsorbent material into the sack not only causes the boom to take on a substantially cylindrical shape, but also compresses and compacts the adsorbent material, resulting in a stiff, densely-packed boom. In addition, the rounded cross-sectional profile of the cylindrical boom may leave very little of the boom (and its associated adsorbent material) in direct contact with the ground, water, or other spill surface. For example, as shown in FIG. 1, a contact surface 16 is limited due to the cylindrical cross-sectional shape of the boom 10. As such, oil or chemical spills may slide under the boom and/or the adsorption process may be slowed due to a lack of surface area of the adsorbent material being in contact with the contaminant(s), thereby not allowing much of the oil or other chemical material to adhere to the surface of the adsorbent material. Furthermore, the adsorbent material generally becomes less adsorbent when compacted, similar to the lost absorption properties of a squeezed sponge.

In addition to the disadvantages in adsorption associated with the process of making conventional booms, the process also tends to make the booms semi-rigid, thereby reducing their flexibility when deployed around spills. Additionally, as shown in FIG. 2, the boom 10 cannot effectively be wound tightly when undeployed, thereby consuming a large amount of storage space and/or making the boom 10 unwieldy to handle prior to and during deployment around spills.

Accordingly, the present disclosure describes a system and method intended to address the issued discussed above and/or other issues.

SUMMARY

In accordance with an aspect of the disclosure, a boom system for the containment of contaminants is disclosed. The boom system includes a cover and an adsorbent or absorbent material disposed within the cover, wherein the material is formed of at least one sheet of flexible, adsorbent or absorbent fabric folded upon itself within the elongated cover.

According to another aspect of the disclosure, a method of forming a boom system for the containment of contaminants is disclosed. The method includes providing an elongated cover capable of retaining a material therein, providing a plurality of fabric sheets formed of an flexible material that is adsorbent or adsorbent, and arranging the plurality of fabric sheets atop one another while folding the fabric sheets to form a nested structure, such as one with a plurality of voids. The method also includes placing the folded fabric sheets into the elongated cover to form an elongated boom.

In accordance with another aspect of the disclosure, a method of manufacturing a boom system for the containment of contaminants is disclosed. The method of manufacturing includes providing a frame structure, providing at least one roll of adsorbent or absorbent material on the frame structure, the at least one roll of material being rotatable relative to the frame structure, and providing a funnel structure, the funnel structure having an first opening facing the frame structure and a second, opposite opening, wherein the funnel structure has a width that is narrower than the width of at least one of the at least one roll of adsorbent material. The method also includes providing an elongated mesh cover proximate the second opening of the funnel structure, the elongated mesh cover capable of retaining a material therein, pulling a sheets of material from the at least one roll of material through the funnel structure to form a core having a structure of nested layers, and pulling the core through the elongated mesh cover to form a boom.

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "top", and "bottom" are not intended to limit the invention to a particular direction or orientation, but instead are only intended to denote relative positions, or positions corresponding to directions shown when a boom or boom manufacturing system is oriented as shown in the Figures.

Figure 3A:
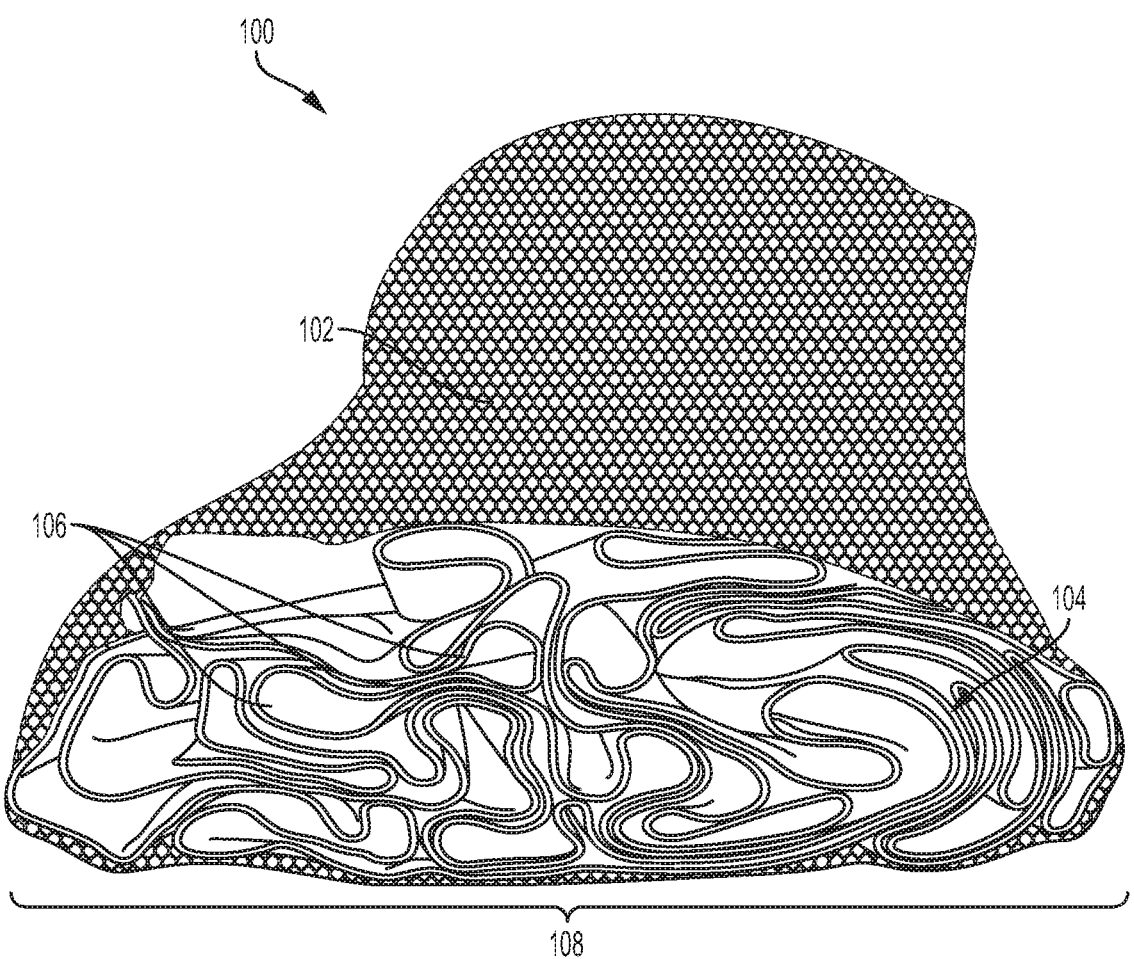
FIG. 3A is a partial perspective view of a boom system in accordance with an aspect of the disclosure.
Figure 3B:
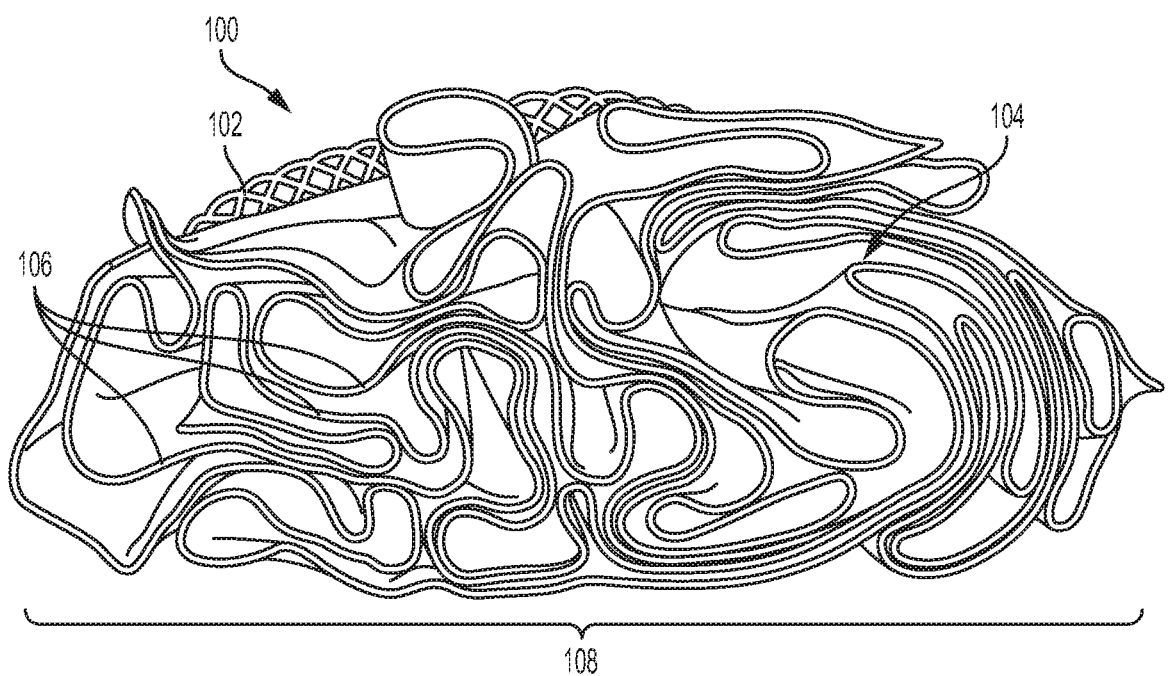
FIG. 3B is a cross-sectional view of the boom system of FIG. 3A.

Referring to FIGS. 3A-3B, cut-away cross sectional views of a boom system 100 in accordance with an aspect of the disclosure is shown. Boom system 100 includes a mesh cover 102, wherein the cover 102 is configured to substantially retain an adsorbent material 104 therein. The cover 102 may be formed of any appropriate flexible material, and may be formed of an impermeable material such as plastic, vinyl, polyethylene, urethane-coated polyester or canvas, or another impermeable material. Alternatively, cover 102 may be formed of a permeable material, such as a fibrous polyester material, a cellulosic material, a blend of polyester with cellulosic material, polypropylene, etc. While cover 102 is shown in FIG. 3A as being formed as a substantially mesh-like netting, it is to be understood that cover 102 may take other forms, such as a more tightly-woven sock-like structure, or a series of smaller covering structures such as loops, bands, rings, or other securing structures that cover some, but not necessarily all, of the adsorbent material 104. Furthermore, cover 102 (and boom system 100) may be of any appropriate length. For example, in some embodiments, boom system 100 may be 10 feet in length, while in other embodiments, boom system 100 may be longer (e.g., 25 feet in length). However, it is to be understood that boom system 100 may be shorter or longer than the examples provided above, and, therefore, is not limited by the examples discussed in this patent document. Additionally, boom system 100 may be configured to be couplable to one or more additional boom systems 100 to form an elongated chain of boom systems of any desired length.

Figure 1:
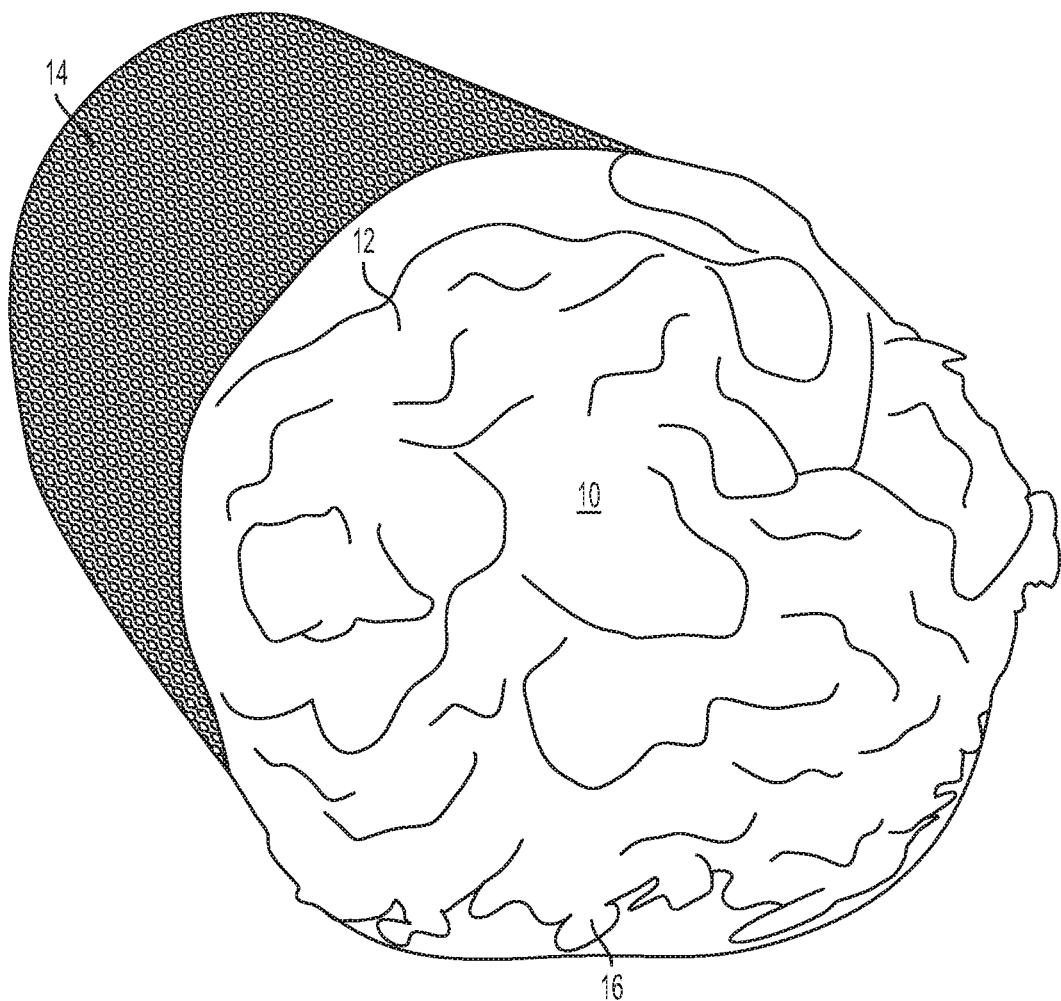
FIG. 1 is partial cross-sectional view of a boom system in accordance with the prior art.
Figure 2:
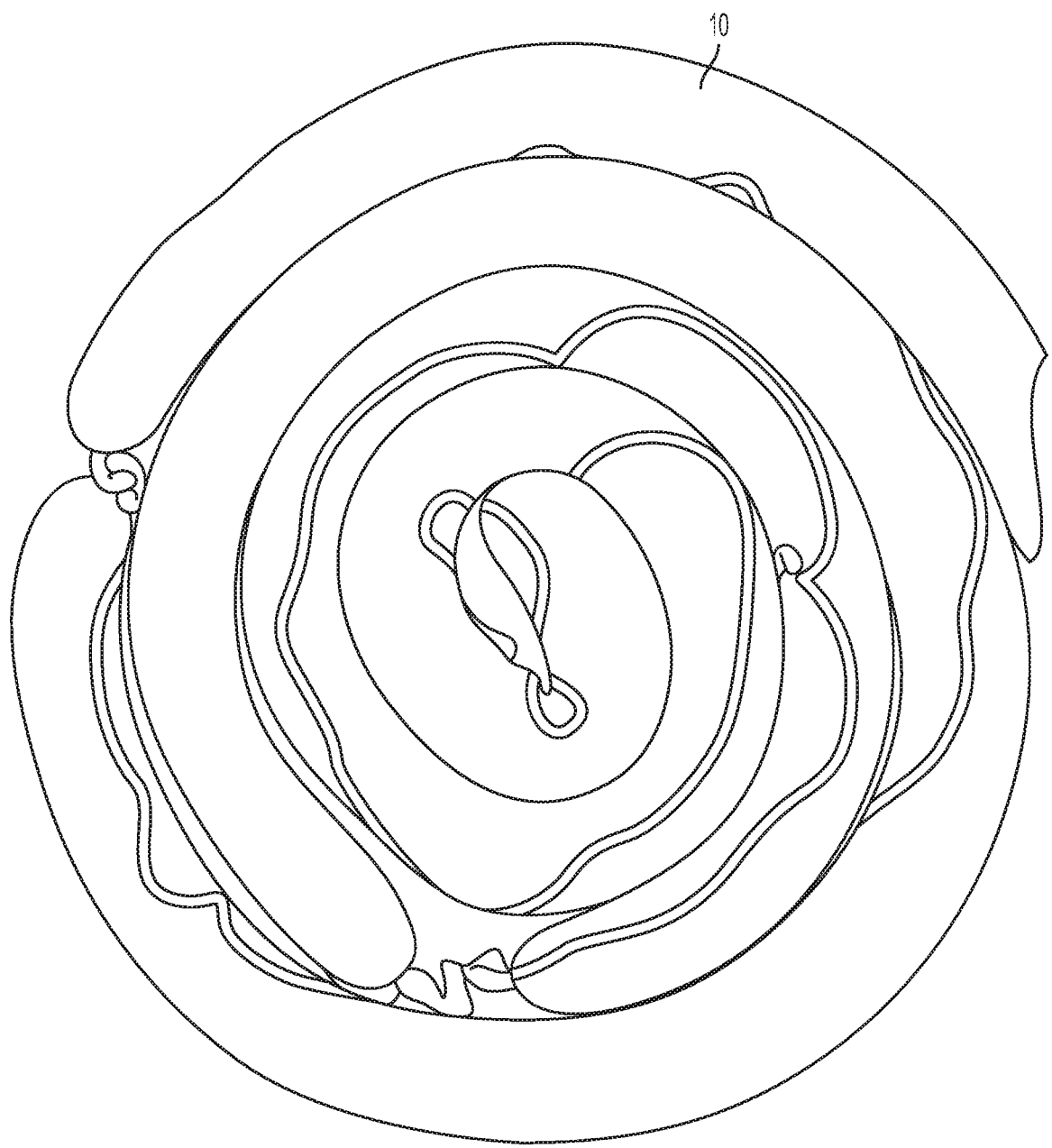
FIG. 2 is a top view of an undeployed, coiled boom system in accordance with the prior art.

Unlike material 12 discussed above with respect to FIG. 1, which is stuffed into a boom cover in the form of pulp, flakes, etc., adsorbent material 104 is formed of one or more flexible and compressible elongated sheets 106 of adsorbent material. The adsorbent sheets 106 may be formed via any appropriate method, for example by hydro-entanglement (i.e., spunlace). The sheets 106 may be layered atop one another and/or inwardly folded so as to form a nested, adsorbent structure of a desired thickness (e.g., 1-5 inches), and the layered sheets 106 may then be pulled, pushed, or loosely stuffed into the cover 102 to form the boom system 100.

In one aspect, and as will be described in further detail below, a plurality of sheets 106 may be vertically arranged relative to one another, and the edges of each sheet may be inwardly folded into substantially C-shaped, loosely-packed, nested formations (as shown in FIGS. 3A-3B) such that no sheet 106 is flat (i.e., disposed along a single plane). In this document, "nested" sheets refers to one or more folds being disposed within other, larger folds, thereby forming a convoluted structure. Each sheet 106 includes a plurality of arcs that form rounded peaks, valleys, and/or side-facing curves such that a plurality of voids are formed between the nested sheet 106, which are then pulled through cover 102 to form the boom system 100. The C-shaped formations provide for increased interstitial space between the various layers of sheets 106 as compared to earlier methods, which tightly compacted the adsorbent (or absorbent) material within the boom cover. Accordingly, the C-shaped formations enable increased compressibility of boom system 100, while still allowing the boom system 100 to remain structurally resilient when deployed. Furthermore, the C-shaped formations of sheets 106 (and the interstitial space between those formations) also allow for more surface area of the adsorbent material 104 to be in contact with the spilled oil or other contaminant(s), thereby increasing the adsorption capabilities of the boom system 100. As used in this document, a "C-shaped" formation refers to any fold that is curved to form a space that separates two portions of the folded sheet, regardless of orientation. Thus, a "C-shape" may include a U-shape, a backwards C-shape, an upside-down U-shape, and the like.

While FIGS. 3A-3B illustrate sheets 106 of adsorbent material 104 provided in a plurality of C-shaped formations, it is to be understood that sheets 106 may be folded or conformed in any appropriate manner so as to provide both loft when boom system 100 is deployed and compressibility when boom system 100 is undeployed. For example, sheets 106 may be provided in a plurality of Z-shaped formations, honeycomb formations, or any other formation capable of forming a plurality of pleats and/or folds in sheets 106 with interstitial spaces between the sheets 106. By folding or conforming sheets 106 in this way, boom system 100 is highly compressible for packaging and/or transport, but capable of rebounding when deployed. For example, boom system 100 may be compressed to be up to three times, four times, five times or more thinner than its deployed state, thereby greatly reducing the size of boom 100 when in storage and/or transport. Additionally, the interstitial spaces between the respective sheets 106 provides for a greater amount of adsorbent surface area upon which any contaminants may adhere.

Adsorbent material 104, like material 12 described above with respect to FIG. 1, may be formed of an oleophilic yet hydrophobic material, such as, e.g., polyester and/or polypropylene. For example, in one aspect, adsorbent material 104 is formed of a combination of polyester material and polypropylene material, with the polyester material accounting for at least 75% of adsorbent material 104, and the polypropylene material accounting for the remainder of the adsorbent material 104. In another aspect, adsorbent material 104 may be formed entirely of a polyester material. However, it is to be understood that adsorbent material 104 is not limited to the above examples, and adsorbent material 104 may be formed of any appropriate material.

In this document, the phrase "polyester material" may be used to refer to a material that is substantially (i.e., more than 50%) polyester. In embodiments in which the adsorbent material 104 is formed at least substantially of a polyester material, boom system 100 is generally capable of rebounding to a given operational size, even after being compressed for storage, transit, etc. This rebounding feature is due to the polyester material's natural fiber characteristics, which may substantially return the material to its original shape, even when deformed and/or compressed. Other materials, such as polypropylene, nylon, etc., do not generally possess such rebounding characteristics. Thus, a boom system 100 formed substantially of a polyester material may be compressed for packaging, storage, and/or transport, and may naturally decompress (i.e., rebound) to a desired operational volume when deployed.

Furthermore, the compressibility and reboundability of the polyester material forming the adsorbent material 104 may also allow for reclamation of the oil or other contaminant adsorbed by the boom system 100. That is, after the spill or other contamination is sufficiently contained and/or the adsorbent material 104 is no longer capable of adsorbing additional contaminants, the boom system 100 may be removed from the site and compressed to wring the contaminants from the boom system 100 for reclamation and/or disposal. The boom system 100 may then be properly destroyed or disposed of, or, in some instances, reused for additional spill containment. While a polyester material is shown, it is to be understood that adsorbent material 104 may be formed of any suitable compressible or reboundable material.

Referring still to FIGS. 3A-3B, boom system 100, when deployed, forms a substantially elliptical cross-section due to the multi-layered retention of sheets 106 within cover 102. With such a substantially elliptical cross-section, a contact surface 108 of the boom system 100 extends across a significantly greater area than the contact surface of a conventional cylindrical boom system. For example, the contact surface area covered by contact surface 108 (which is shown as the bottom of the boom) may be up to 75% greater than the contact surface area covered by a conventional boom system. While a substantially elliptical cross-section is shown in FIGS. 3A-3B, it is to be understood that the cross-section of boom system 100 may be another shape (e.g., rectangular, trapezoidal, etc.) depending on the number and orientation of sheets 106, the method in which sheets 106 are disposed within the cover 102, the material(s) used for both sheets 106 and cover 102, etc. With greater contact surface area, boom system 100 is capable of containing and/or adsorbing more contaminants than a conventional cylindrical boom system. Furthermore, due to both the greater contact surface area and the less compact nature of the layered sheets 106, boom system 100 may adsorb spilled contaminants at a higher rate than conventional boom systems. For example, boom system 100 may adsorb contaminants such as oil at a rate 50% faster than a conventional cylindrical boom system.

While adsorbent material 104 is described above as an oleophilic, hydrophobic material such as, e.g., polyester and/or polypropylene, it is to be understood that adsorbent material 104 may be any appropriate material and may be used for spills other than those involving hydrocarbons. For example, material 104 may be an absorbent, hydrophilic material for use with water-based spills. Furthermore, the material 104 may include surface active agents (i.e., "surfactants"), which may act as wetting agents and lower the surface tension between the solid material 104 and the contaminant, thereby increasing the absorption and/or adsorption rate of the contaminant.

Figure 4:
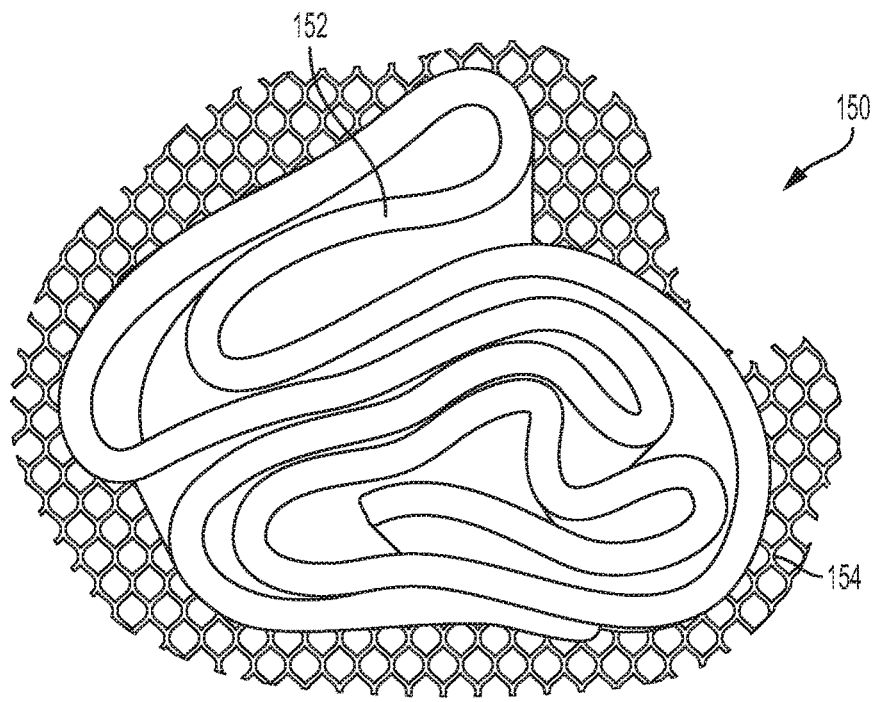
FIG. 4 is a cross-sectional view of a boom system in accordance with another aspect of the disclosure.

Next, referring to FIG. 4, a boom system 150 in accordance with another aspect of the disclosure is illustrated. Unlike boom system 100 described above with respect to FIGS. 3A-3B, which includes a plurality of nested, convoluted sheets 106 to form the adsorbent material 104, boom system 150 is formed of a single sheet 152 of an adsorbent material. Sheet 152, like sheets 106, may be folded upon itself to form a plurality of C-shaped (or otherwise-shaped) formations, which provide for increased interstitial space between the various folds of sheet 152 to increase the surface area of adsorbent material in contact with the contaminant spill.

Figure 5:
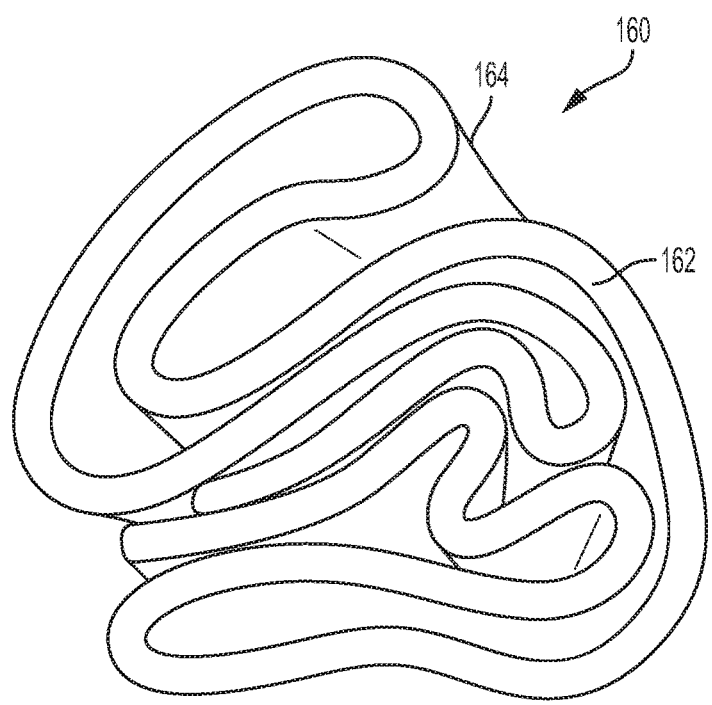
FIG. 5 is a cross-sectional view of a boom system in accordance with another aspect of the disclosure.

While FIG. 4 illustrates that sheet 152 may be surrounded by a cover 154 (such as a length of mesh netting or a series of partially covering rings, bands, or loops) to form boom system 150, in accordance with another aspect of the disclosure, a cover may not be needed to form an adsorbent boom system. For example, referring to FIG. 5, a boom system 160 is illustrated, wherein boom system 160 includes only a single sheet 162 of adsorbent material folded upon itself to form a convoluted structure. With no cover to retain the shape of sheet 162 in its folded state, sheet 162 may be held together through any appropriate means. For example, one or more folds 164 of sheet 162 may be ultrasonically welded or affixed with fasteners (e.g., nylon ties or other partial covers, grommets, etc.) to other surfaces of the sheet 162 so as to allow boom system 160 to retain its folded state. Accordingly, boom system 160 may provide the increased adsorption capabilities of boom systems 100, 150 described above, but with a simplified construction.

Figure 6:
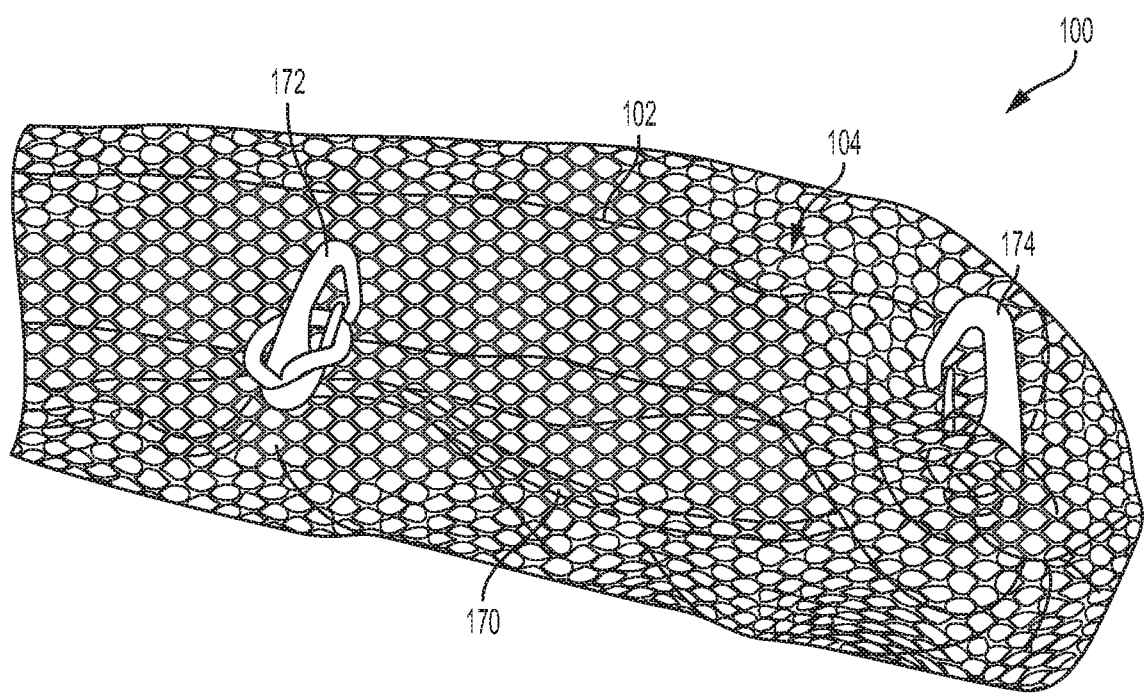
FIG. 6 is a partial top view of a boom system end connector arrangement in accordance with an aspect of the disclosure.

Next, referring to FIG. 6, an end of boom system 100 in accordance with an aspect of the disclosure is shown. While boom system 100 includes an adsorbent material 104 substantially surrounded by a cover 102, boom system 100 may further include a line 170 positioned between the cover 102 and adsorbent material 104, wherein line 170 may be configured to provide additional structural support to the boom system, as well as a secure coupling location between adjacent boom systems when joined together. Line 170 may be formed as any appropriate lead, such as a length of rope, cord, ribbon, etc. In some embodiments, one or more fasteners may be coupled to line 170 to aid in the connection of one or more additional boom systems. For example, as shown in FIG. 6, each boom system 100 may include an inboard fastener 172 and an end fastener 174 at each respective end of the boom system 100. With such a configuration, adjacent boom systems 100 may be coupled to one another via the respective fasteners 172, 174, with the portion of adsorbent material 104 between fasteners 172, 174 overlapping for each respective boom system 100 in order to prevent bypass of contaminants between coupled boom systems 100. Additionally and/or alternatively, one or more of the fasteners 172, 174 may be utilized to couple the boom system 100 to other features, such as stakes, buoys, etc.

While not shown in FIG. 6, in accordance with another aspect of the disclosure, instead of overlapping ends of adjacent boom systems 100 by coupling fasteners 172, 174, a sleeve or collar having an adsorbent material therein may be utilized over a portion of adjacent end surfaces of coupled boom systems 100. With such a configuration, two or more boom systems 100 may be coupled by only respective end fasteners (e.g., fasteners 174) to form a continuous system that substantially prevents bypass of contaminants between the coupled boom systems 100, while also avoiding potentially wasteful overlap of adsorbent materials.

Figure 7:
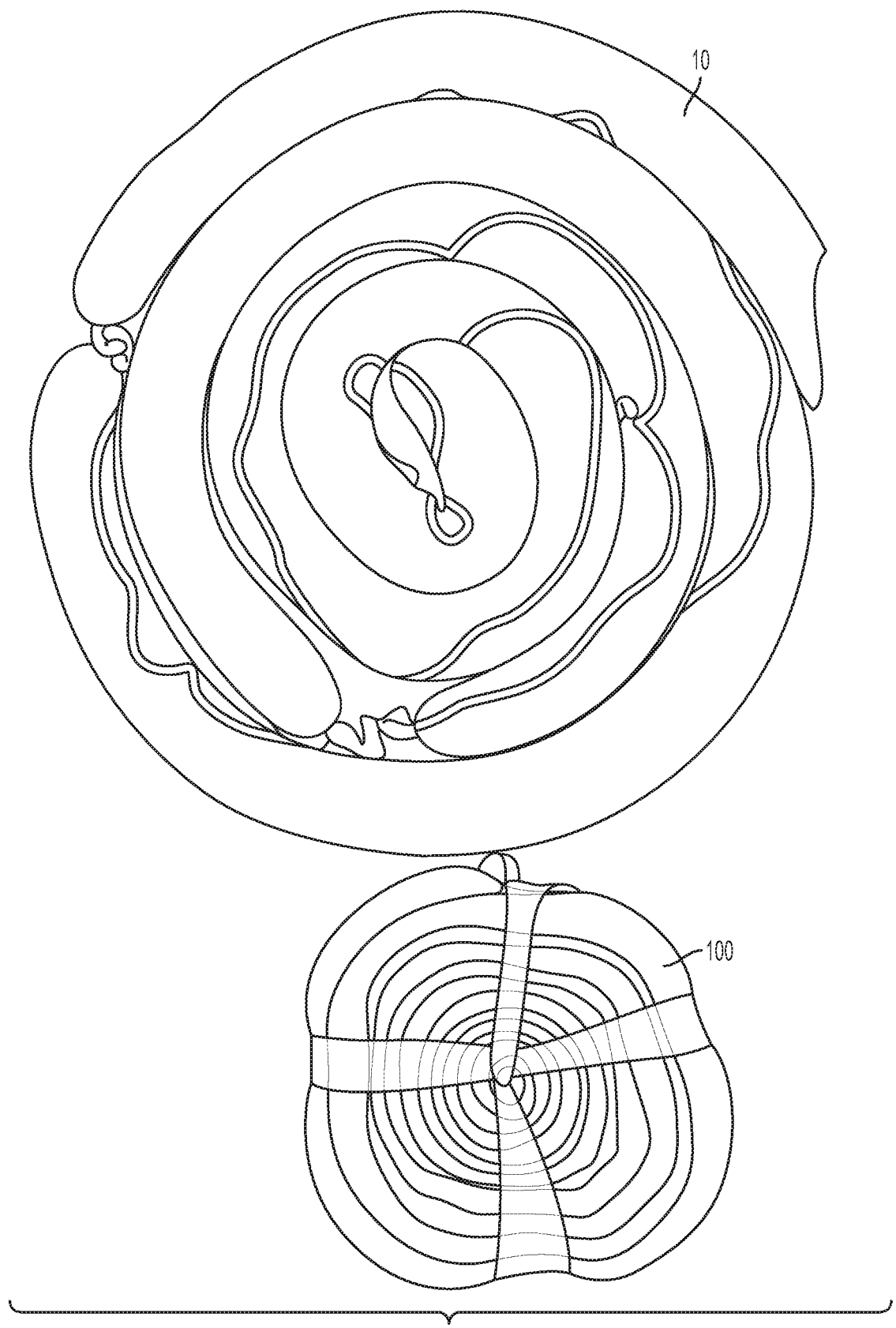
FIG. 7 is a top view comparison of an undeployed, coiled boom system in accordance with the prior art with an example of an undeployed, coiled boom system in accordance with an aspect of the present disclosure.

In addition to the notable advantages in contaminant adsorption due to the use of nested sheets 106 within cover 102, boom system 100 may also be capable of being tightly wound into a coil for both storage and transport to the site of a spill. As is illustrated in FIG. 7, boom system 100, when wound, includes little or no voids between rings and thus takes up significantly less storage area than the conventional, prior art boom system 10. For example, boom system 100 may take up 70% less storage space than prior art boom system 10. As noted above, in some embodiments, the nested, vertically-arranged sheets 106 may be formed substantially of a polyester material, which may allow for the boom system 100 to be tightly compressed for storage and/or transport, but to rebound to a desired operational size when uncoiled and deployed for use.

Furthermore, boom system 100 may also be capable of being unwound and deployed more quickly than a conventional cylindrical boom system. That is, due to the larger and more flat contact surface 108, the boom system 100 may be unrolled quickly and easily, similar to a rolled rug being unwound. Additionally, the compressible fabric sheets 106 also allow boom system 100 to be more flexible than a conventional boom system having semi-rigid, highly-compressed adsorbent material therein. Thus, boom system 100 is capable of being manipulated in various directions, which allows the user of boom system 100 to quickly surround spills.

Figure 8:
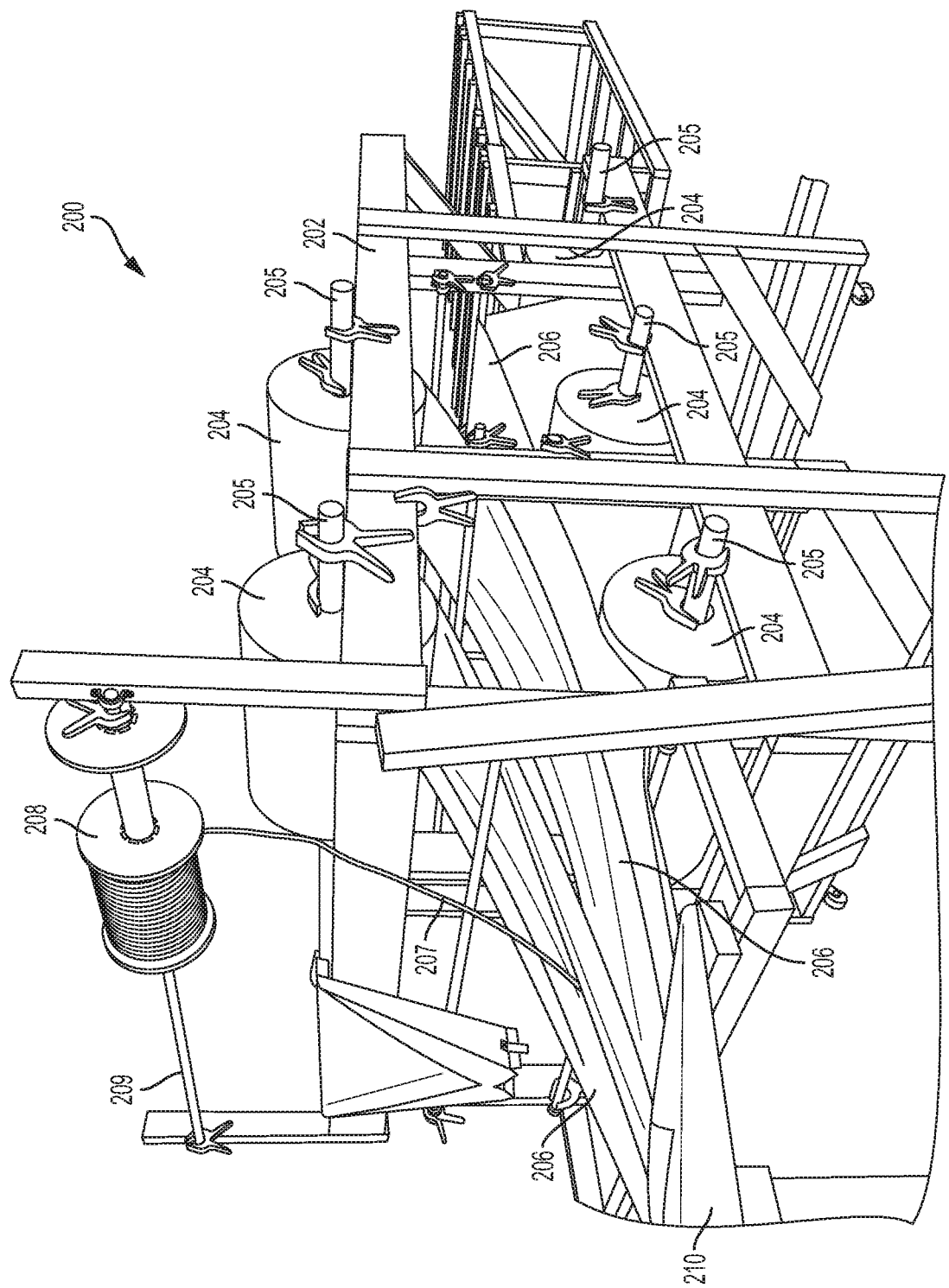
FIG. 8 is a perspective view of a system for manufacturing a boom in accordance with an aspect of the present disclosure.

Next, referring to FIGS. 8-11, a system and method of manufacturing a boom system in accordance with an aspect of the disclosure is illustrated. As shown in FIG. 8, a boom manufacturing system 200 comprises a frame structure 202 having a plurality of material rolls 204 rotatably supported on a plurality of shafts 205 and dispersed both horizontally and vertically within frame structure 202. In FIG. 8, a total of five separate material rolls 204 are shown within frame structure 202, with three rolls 204 aligned horizontally along one plane and two other rolls 204 disposed above and aligned horizontally along another plane. However, it is to be understood that boom manufacturing system 200 may utilize any number of material rolls 204. For example, as described above with respect to FIGS. 4-5, a boom system may be formed of only a single sheet of adsorbent material. In such a configurations, only one material roll 204 would be utilized.

Each material roll 204 holds a length of an adsorbent material sheet 206. In one embodiment, adsorbent material sheets 206 are a fabric formed primarily of a polyester material. However, adsorbent material sheets 206 may be any suitable adsorbent (or absorbent) material. The adsorbent material sheets 206 shown in FIG. 8 have an equal width (e.g., 16 inches). However, adsorbent material sheets 206 may be any width, and all adsorbent material sheets 206 held within frame 202 do not necessarily need to be of equal width. That is, within the same boom, different adsorbent material sheets 206 may have varying widths.

During construction of a boom system (such as boom system 100 described above with respect to FIGS. 3A-3B), adsorbent material sheets 206 are pulled from each roll 204 in the direction of a first opening of a funnel 210, with the adsorbent material sheets 206 eventually converging before entry into funnel 210 in a layered fashion. The adsorbent material sheets 206 may either be pulled manually (i.e., by hand) or mechanically. Additionally, a length of line 207 may be pulled from a spool 208 concurrently with the adsorbent material sheets 206. Line 207 may be configured to provide additional structural support to the boom system, as well as a secure coupling location between adjacent boom systems when joined together. Line 207 may be formed as any appropriate lead, such as a length of rope, cord, ribbon, etc. Alternatively, in some embodiments, line 207 may be omitted from the boom system. Furthermore, construction of the boom system may also include manual or automatic steps of cutting and/or crimping the ends of the adsorbent material sheets 206, installing fasteners, coiling the boom system into a transportable roll, and/or binding the boom system in a coiled configuration.

Figure 9:
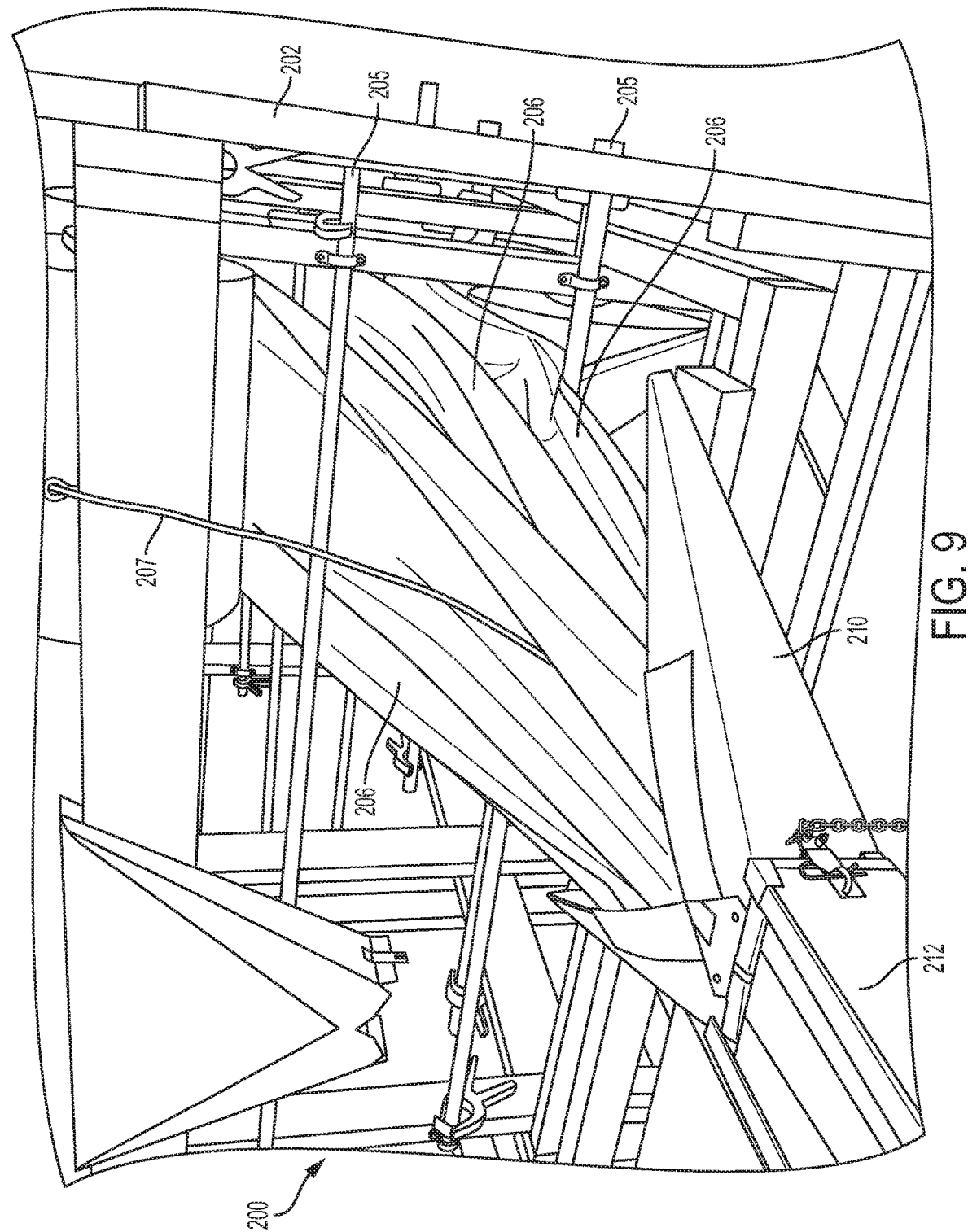
FIG. 9 is a perspective view of adsorbent material sheet entry into a funnel for formation of a boom in accordance with an aspect of the present disclosure.
Figure 10:
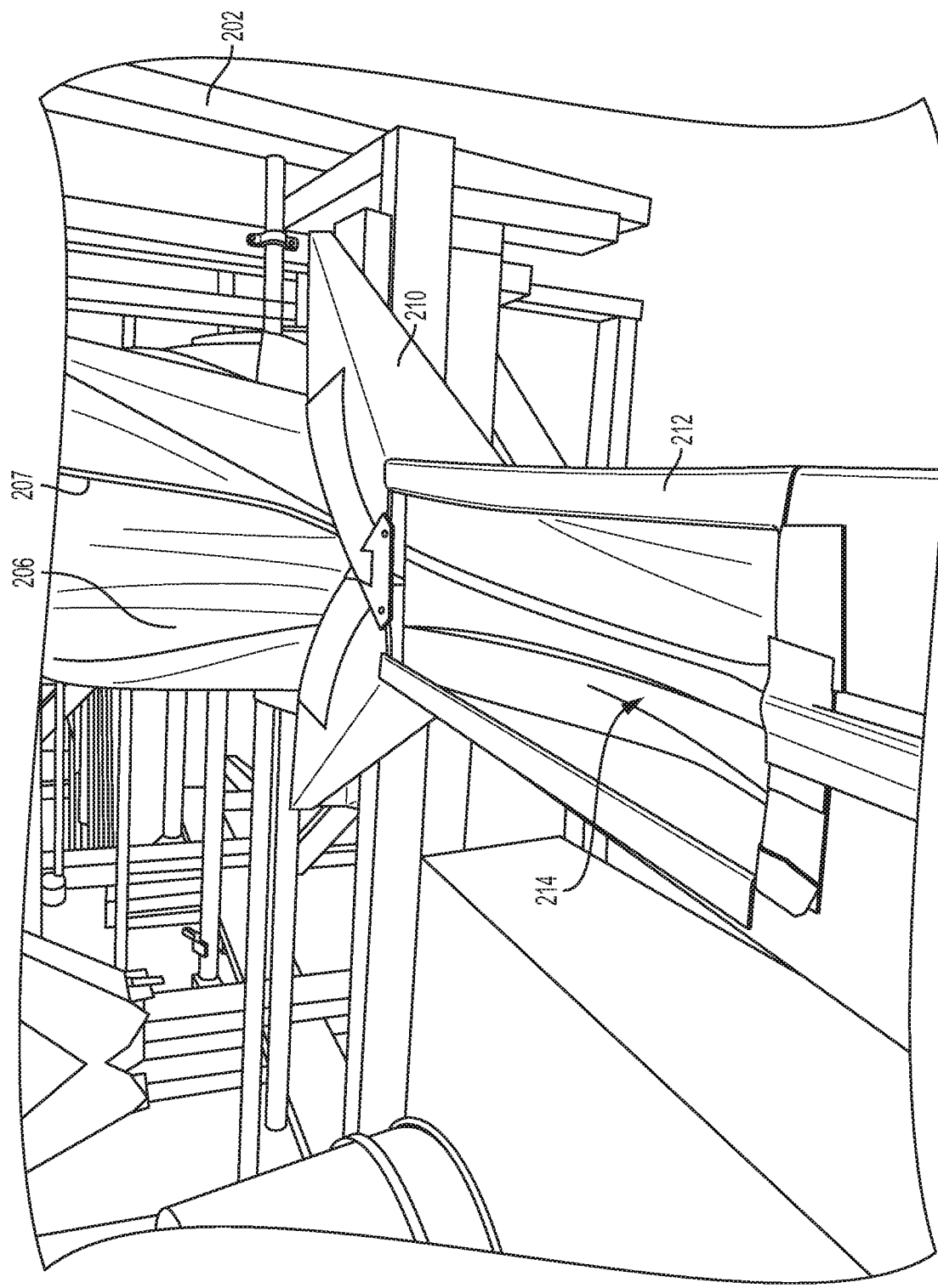
FIG. 10 is a perspective view of adsorbent material sheet entry into a funnel and chute for formation of a boom in accordance with an aspect of the present disclosure.

Referring to FIGS. 9-10, the opening area of funnel 210 has a width that is narrower than the width of at least some of the sheets 206. Thus, as adsorbent material sheets 206 are pulled through funnel 210, funnel 210 is configured to force the edges of the adsorbent material sheets 206 to fold inward. As the funnel 210 becomes narrower, each sheet 206 forms additional folds atop of itself, creating a plurality of C-shaped formations of adsorbent material, as discussed above with respect to FIGS. 3A-3B. Once again, the funnel 210 may be configured such that the adsorbent material sheets 206 create other formations, such as Z-shaped, honeycombed, etc. Additionally and/or alternatively, in one aspect of the disclosure, the opening area of funnel 210 may be adjustable so as to accommodate different amounts and/or sizes of materials, different desired widths of the boom system, etc.

Upon exiting a second opening in funnel 210, opposite the first opening, the folded adsorbent material sheets 206 together form an adsorbent core 214, which is fed through an elongated chute 212, thereby forming the adsorbent structure of the boom system. The adsorbent material sheets 206, which originate as a certain width (e.g., 16 inches), are thus folded upon themselves to form the narrower adsorbent core 214 (e.g., 5 inches).

Figure 11:
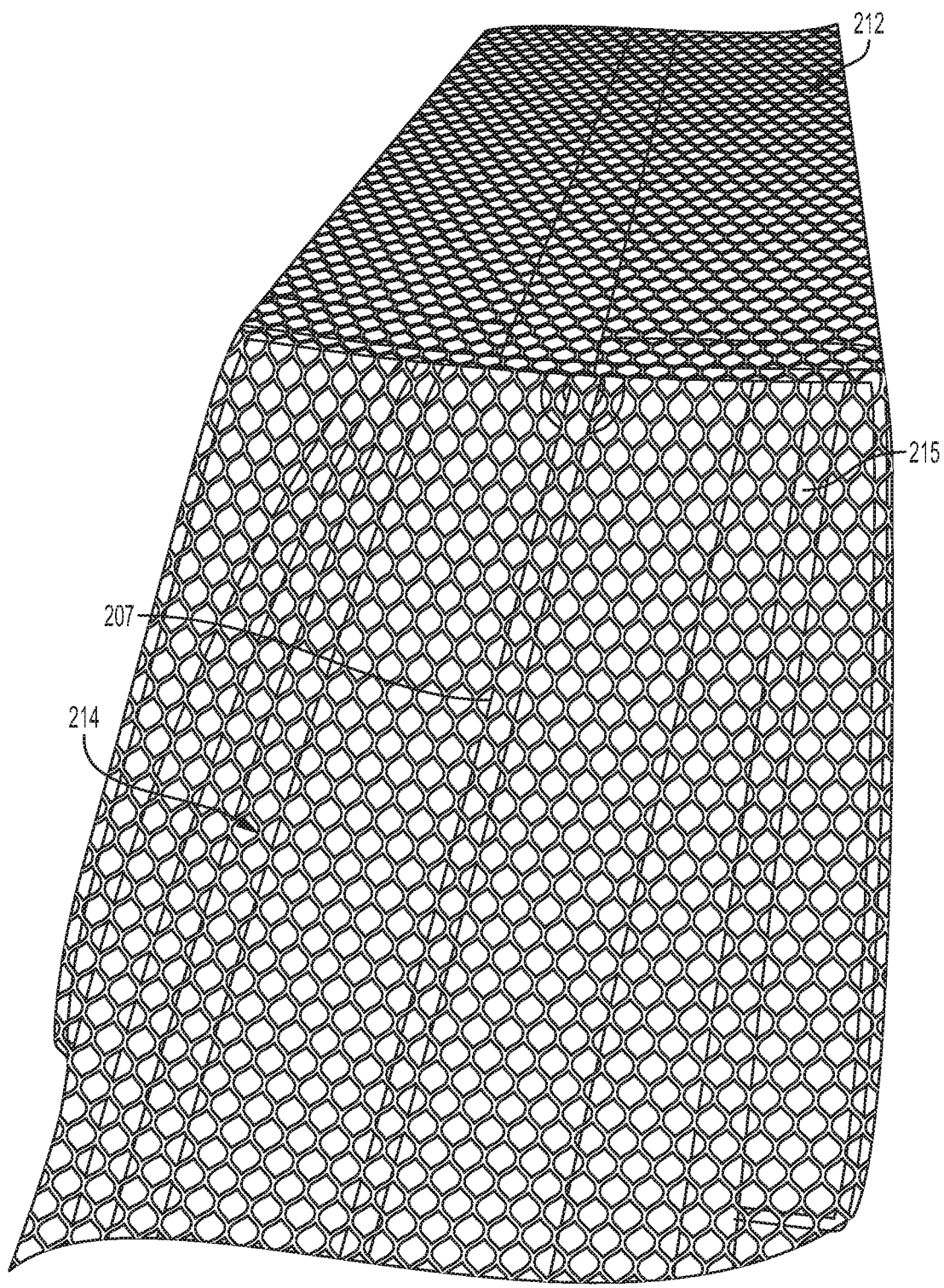
FIG. 11 is a perspective view of an adsorbent core entry into a permeable cover for formation of a boom in accordance with an aspect of the present disclosure.

Referring to FIG. 11, as the length of the adsorbent core 214 and line 207 are pulled through elongated chute 212, they may be pulled into a permeable cover 215, such as, for example, a mesh-like netting or sock. The cover 215 may be formed of any appropriate flexible material, and may be formed of an impermeable material such as plastic, vinyl, polyethylene, urethane-coated polyester or canvas, or another impermeable material. Alternatively, cover 215 may be a formed of a permeable material, such as a fibrous polyester material, a cellulosic material, a blend of polyester with cellulosic material, polypropylene, etc. The cover 215 acts to retain the adsorbent core 214 such that the adsorbent core 214 maintains its plurality of folds and the voids formed by the folds, both when compressed for storage and when deployed for active use. Once a preferred length of the adsorbent core 214 is pulled through an equal length of cover 215 (e.g., 25 feet), both the adsorbent core 214 and cover 215 may be trimmed and closed on each end so as to form a usable boom system for the adsorption of oil or other contaminants. As disclosed above with respect to FIG. 7, the boom system may be coiled and/or compressed for compact storage and transport, and may be easily unfurled and decompressed when needed for spill containment.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this invention is not limited to the particular embodiments described herein, but is intended to include all changes and modifications that are within the scope and spirit of the invention as defined in the claims.

The invention claimed is:

1. A boom for the containment of contaminants, the boom system comprising:
    a cover; and
    one or more sheets of flexible fabric positioned within the cover and folded to have one or more folds that are disposed within other, larger folds, thereby forming a convoluted structure within the cover,
    wherein each of the sheets comprises an adsorbent material.

2. The boom of claim 1, wherein the adsorbent material comprises polyester or polypropylene.

3. The boom of claim 1, wherein the adsorbent material comprises polyester and polypropylene.

4. The boom of claim 1, wherein the convoluted structure forms a plurality of voids.

5. The boom of claim 1, wherein the one or more sheets of flexible fabric are disposed within the cover to form a non-cylindrical cross-section.

6. The boom of claim 1, wherein the cover comprises a mesh netting material.

7. The boom of claim 1, further comprising:
    a line disposed under the cover; and
    at least one fastener that is coupled to the line and that is configured to enable interconnection between adjacent boom systems.

8. A method of forming a boom for the containment of contaminants, the method comprising:
    providing an elongated cover;
    providing one or more sheets of a flexible fabric material;
    arranging the one or more sheets to have one or more folds that are disposed within other, larger folds, thereby forming a convoluted structure; and
    placing the one or more sheets in the form of the convoluted structure into the cover to form a boom.

9. The method of claim 8, wherein
    the one or more sheets comprise a plurality of sheets; and
    arranging the one or more sheets comprises configuring the plurality of sheets in nested layers by arranging the plurality of sheets atop one another while folding the fabric sheets.

10. The method of claim 8, wherein arranging the one or more sheets forms convoluted structure with a plurality of voids.

11. The method of claim 8, wherein placing the one or more sheets into the cover forms a non-cylindrical cross-section.

12. The method of claim 8, wherein the flexible fabric material comprises an adsorbent material.

13. The method of claim 12, wherein the flexible fabric material comprises polyester or polypropylene.

14. The method of claim 12, wherein the flexible fabric material comprises polyester and polypropylene.

15. A boom for the containment of contaminants, the boom comprising:
    a cover; and
    a plurality of sheets of flexible fabric folded upon themselves within the cover, wherein the plurality of sheets are configured in nested layers.

16. The boom of claim 15, wherein the nested layers form a plurality of voids between the sheets, and no sheet is disposed along a single plane.

17. The boom of claim 15, wherein the nested layers form a plurality of C-shaped folds.

18. The boom of claim 15, wherein the flexible fabric comprises polyester or polypropylene.

19. The boom of claim 15, wherein the cover is an elongated cover and comprises a mesh netting material.

20. The boom of claim 15, further comprising:
    a line disposed under the cover; and
    at least one fastener that is coupled to the line and configured to enable interconnection between adjacent boom systems.

* * * * *